(12) United States Patent
Zhang

(10) Patent No.: US 9,561,438 B2
(45) Date of Patent: Feb. 7, 2017

(54) METHOD FOR REALIZING MULTI-PARTY INTERACTIVE COMMUNICATION AND SYSTEM THEREOF

(71) Applicant: Wei Zhang, Henan Province (CN)

(72) Inventor: Wei Zhang, Henan Province (CN)

(73) Assignee: Wei Zhang, Henan Province (CN)

( * ) Notice: Subject to any disclaimer, the term of this patent is extended or adjusted under 35 U.S.C. 154(b) by 451 days.

(21) Appl. No.: 13/861,272

(22) Filed: Apr. 11, 2013

(65) Prior Publication Data
US 2013/0303289 A1      Nov. 14, 2013

(30) Foreign Application Priority Data

May 11, 2012   (CN) .......................... 2012 1 0148169

(51) Int. Cl.
*A63F 13/00*     (2014.01)
*A63F 13/31*     (2014.01)
(Continued)

(52) U.S. Cl.
CPC ............ *A63F 13/31* (2014.09); *A63F 13/12* (2013.01); *A63F 13/327* (2014.09); *A63F 13/34* (2014.09);
(Continued)

(58) Field of Classification Search
CPC ...................................... A63F 13/00
(Continued)

(56) References Cited

U.S. PATENT DOCUMENTS

| 7,698,392 B2 * | 4/2010 | Zapata ...................... G06F 8/65 709/220 |
| 2009/0156179 A1 * | 6/2009 | Hahn .................. G06Q 10/101 455/414.1 |

(Continued)

FOREIGN PATENT DOCUMENTS

| CN | 102315864 A | 1/2012 |
| CN | 102364979 A | 2/2012 |
| TW | 201038103 A | 10/2010 |

OTHER PUBLICATIONS

Office Action dated Feb. 26, 2015 from corresponding TW Application No. 102116643; 10 pages.

(Continued)

*Primary Examiner* — Vivek Srivastava
*Assistant Examiner* — Sibte Bukhari
(74) *Attorney, Agent, or Firm* — Haynes Beffel & Wolfeld LLP

(57) ABSTRACT

The present disclosure makes a method for realizing multi-party interactive communication public, the method includes: a wireless direct connection between a first mobile terminal and at least one second mobile terminal is established; a connection of multi-party interactive communication between the first mobile terminal and the at least one second mobile terminal is established, wherein the wireless direct connection is an underlying link, the first mobile terminal is a server of the multi-party interactive communication, and the at least one second mobile terminal is a client of the multi-party interactive communication; multi-party interactive communication between the first mobile terminal and the at least one second mobile terminal is performed via the connection of multi-party interactive communication. By the method mentioned above, the present disclosure can use wireless communication to realize the (Continued)

multi-party interactive communication among mobile terminals even the network is in a poor situation.

18 Claims, 5 Drawing Sheets

(51) Int. Cl.
    *A63F 13/30* (2014.01)
    *A63F 13/34* (2014.01)
    *A63F 13/92* (2014.01)
    *A63F 13/48* (2014.01)
    *A63F 13/327* (2014.01)
    *A63F 13/352* (2014.01)
    *H04W 8/00* (2009.01)
    *A63F 13/332* (2014.01)

(52) U.S. Cl.
    CPC ............. *A63F 13/352* (2014.09); *A63F 13/48* (2014.09); *A63F 13/92* (2014.09); *H04W 8/005* (2013.01); *A63F 13/332* (2014.09)

(58) Field of Classification Search
    USPC ........................................................ 709/227
    See application file for complete search history.

(56) References Cited

U.S. PATENT DOCUMENTS

2010/0164685 A1   7/2010  Pering et al.
2011/0248853 A1* 10/2011  Roper ................ G08B 21/0286
                                                                        340/573.4
2011/0280233 A1  11/2011  Choi et al.

OTHER PUBLICATIONS

Office Action dated Jul. 22, 2014 from corresponding CN Application No. 201210148169.2; 4 pages.
Office Action dated Apr. 7, 2015 from corresponding CN Application No. 201210148169.2; 4 pages.

* cited by examiner

METHOD FOR REALIZING MULTI-PARTY INTERACTIVE COMMUNICATION AND SYSTEM THEREOF

FIELD OF THE INVENTION

The present disclosure relates generally to mobile communications, and more particularly relates to a method for realizing a multi-party interactive communication and a system thereof.

BACKGROUND OF THE INVENTION

With a developing of communication technology, multi-party interactive communication is popular with the masses. The requirement of sharing the certain information in multiple persons can be satisfied by the multi-party interactive communication. In other words, information sent by anybody in the area of interactive communication can be displayed on other people's display terminal. The information of multi-party interactive communication can be call, video, image, text information and so on.

The multi-party interactive communication in network greatly improves the user experience, but sometimes user experience drops because of the situation of a network or a mobile network is poor, some external conditions such as the load of the network or the mobile network is too high, a error occurs in a link of the network or the mobile causing disconnecting, would interrupt or make a worse influence to the multi-party interactive communication.

How to solve the above mentioned problem is one of the urgent research directions.

SUMMARY OF THE INVENTION

It is an object of the present disclosure to provide a method for realizing an the multi-party interactive communication and a system thereof, which can use wireless communication to realize the multi-party interactive communication between mobile terminals.

A method for realizing multi-party interactive communication, includes: a wireless direct connection between a first mobile terminal and at least one second mobile terminal is established; a connection of multi-party interactive communication between the first mobile terminal and the at least one second mobile terminal is established, wherein the wireless direct connection is an underlying link, the first mobile terminal is a server of the multi-party interactive communication, and the at least one second mobile terminal is a client of the multi-party interactive communication; multi-party interactive communication between the first mobile terminal and the at least one second mobile terminal is performed via the connection of multi-party interactive communication.

In a preferred embodiment, the step of "performing multi-party interactive communication between the first mobile terminal and the at least one second mobile terminal via the connection of multi-party interactive communication" includes: a communication data is received by the first mobile terminal; whether the communication data is sent to the server or clients of the multi-party interactive communication is determined, wherein the determination is based on a first mark carried by the communication data; if the communication data is sent to the server of the multi-party interactive communication, sending a receiving communication data to the server of the multi-party interactive communication in the first mobile terminal; else if the communication data is sent to the clients of the multi-party interactive communication, whether the communication data is sent to the clients of the multi-party interactive communication in the first mobile terminal or in the at least one second mobile terminal is determined; if the communication data is sent to the client of the multi-party interactive communication in the first mobile terminal, the clients of the multi-party interactive communication in the first mobile terminal receives the communication data, else the communication data is discarded.

In a preferred embodiment, after sending the receiving communication data to the server of the multi-party interactive communication in the first mobile terminal, the method further includes: the receiving communication data is processed by the server of the multi-party interactive communication in the first mobile terminal and obtaining a processing result; the processing result is sent to the clients of the multi-party interactive communication in the first mobile terminal and the at least one second mobile terminal to update their own display interfaces of the multi-party interactive communication, wherein the processing result is broadcasted to the client of the multi-party interactive communication in the at least one second mobile terminal by Bluetooth.

In a preferred embodiment, the step of "performing multi-party interactive communication between the first mobile terminal and the at least one second mobile terminal via the connection of multi-party interactive communication" includes: a communication data waiting for sending is received by the first mobile terminal; whether the communication data is sent to the server of the multi-party interactive communication in the first mobile terminal or to the client of the multi-party interactive communication in the at least one second mobile terminal is determined; if the communication data is sent to the server of the multi-party interactive communication in the first mobile terminal, the communication data is sent to the server of the multi-party interactive communication in the first mobile terminal directly, else if the communication data is sent to the client of the multi-party interactive communication in the at least one second mobile terminal, the communication data is sent to the clients of the multi-party interactive communication in the at least one second mobile terminal by Bluetooth.

In a preferred embodiment, the step of "determining whether the communication data is sent to the server of the multi-party interactive communication in the first mobile terminal or to the client of the multi-party interactive communication in the at least one second mobile terminal" includes: whether the communication data comes from the client of the multi-party interactive communication in the first mobile terminal is determined according to a second mark carried by the communication data, if the communication data comes from the client of the multi-party interactive communication in the first mobile terminal, the communication data is considered to be sent to the server of the multi-party interactive communication in the first mobile terminal, else the communication data is considered to be sent to the client of the multi-party interactive communication in the at least one second mobile terminal.

In a preferred embodiment, the step of "else if the communication data is sent to the client of the multi-party interactive communication in the at least one second mobile terminal, sending the communication data to the clients of the multi-party interactive communication in the at least one second mobile terminal by Bluetooth" includes: if the communication data is sent to the client of the multi-party interactive communication in the at least one second mobile terminal, the communication data is sent to the client of the multi-party interactive communication in the at least one second mobile terminal corresponding to the third mark by Bluetooth, wherein a third mark corresponding to the client of the multi-party interactive communication in the at least one second mobile terminal is carried by the communication data.

In a preferred embodiment, the step of "establishing a connection of multi-party interactive communication between the first mobile terminal and the at least one second mobile terminal, wherein the wireless direct connection is an underlying link, the first mobile terminal is a server of the multi-party interactive communication, and the at least one second mobile terminal is a client of the multi-party interactive communication" includes: whether there is a server of the multi-party interactive communication is determined; if the first mobile terminal is the server of the multi-party interactive communication, the wireless direct connection is taken as the underlying link, the first mobile terminal is taken as the server of the multi-party interactive communication, to receive a communication connection request from the at least one second mobile terminal; after agreeing the communication connection request, the connection of multi-party interactive communication between the first mobile terminal and the at least one second mobile terminal is established.

In a preferred embodiment, before the step of "establishing a connection of multi-party interactive communication between the first mobile terminal and the at least one second mobile terminal", the method further includes: the first mobile terminal enables the function of being found of the Bluetooth connection.

In a preferred embodiment, the step of "establishing the connection of multi-party interactive communication between the first mobile terminal and the at least one second mobile terminal" includes: whether the number of the participants satisfies the condition of performing multi-party interactive communication is determined, if the number satisfies the condition, performing the multi-party interactive communication is performed and the function of being found of the Bluetooth connection is disabled; else waiting until the condition is satisfied.

In a preferred embodiment, after the step of "performing multi-party interactive communication between the first mobile terminal and the at least one second mobile terminal via the connection of multi-party interactive communication", the method further includes: the server of the multi-party interactive communication in the first mobile terminal receives a request of quitting from the multi-party interactive communication or a communication error report from the client of the multi-party interactive communication in the at least one second mobile terminal; whether the request of quitting from the multi-party interactive communication should be agreed is determined, and whether the connection of multi-party interactive communication should be disconnected is determined; if the request should be agreed or the connection of multi-party interactive communication should be disconnected, the connection of multi-party interactive communication between the first mobile terminal and the second mobile terminal is disconnected corresponding to the request or to the communication error, and an information of disconnecting the connection is sent to clients in other second mobile terminals performing the multi-party interactive communication.

In a preferred embodiment, the multi-party interactive communication in the first mobile terminal and the second mobile terminal is based on iOS.

Furthermore, it is another object to provide a system of realizing multi-party interactive communication.

A system of realizing multi-party interactive communication, including: a first establishing module for establishing a wireless direct connection between a first mobile terminal and at least one second mobile terminal; a second establishing module for establishing a connection of multi-party interactive communication between the first mobile terminal and the at least one second mobile terminal, wherein the wireless direct connection is an underlying link, the first mobile terminal is a server of the multi-party interactive communication, and the at least one second mobile terminal is a client of the multi-party interactive communication; and a first communication module for performing multi-party interactive communication between the first mobile terminal and the at least one second mobile terminal via the connection of multi-party interactive communication.

In a preferred embodiment, the first communication module includes: a first receiving unit for taking the first mobile terminal to receive a communication data after the connection of multi-party interactive communication is established; a first determination unit for determining whether the communication data is sent to the server of the multi-party interactive communication or to the clients of the multi-party interactive communication, wherein the determination is based on a first mark carried by the communication data; a first sending unit for sending a receiving communication data to the server of the multi-party interactive communication in the first mobile terminal when the communication data is sent to the server; a second determination unit for determining whether the communication data is sent to the clients of the multi-party interactive communication in the first mobile terminal or in the at least one second mobile terminal when the communication data is sent to the clients; a second receiving unit for taking the client of the multi-party interactive communication in the first mobile terminal to receive the communication data when the determination of the second determination unit is that the communication data is sent to the client of the multi-party interactive communication in the first mobile terminal; a first filter unit for discarding the communication data when the communication data is sent to the client of the multi-party interactive communication in the at least one second mobile terminal.

In a preferred embodiment, the system further includes: a first processing module for taking the server of the multi-party interactive communication in the first mobile terminal to process the communication data and obtain the processing result after the first sending unit sending the receiving communication data to the first mobile terminal; a first sending module for sending the processing result to the client of the multi-party interactive communication in the first mobile terminal and to the client of the multi-party interactive communication in the at least one second mobile terminal to update their display interfaces of the multi-party interactive communication, wherein the processing result is broadcasted to the client of the multi-party interactive communication in the at least one second mobile terminal by Bluetooth.

In a preferred embodiment, the first communication module includes: a third receiving unit for taking the first mobile terminal to receive the communication data from itself; a third determination unit for determining whether the communication data is sent to the server of the multi-party interactive communication in the first mobile terminal or the client of the multi-party interactive communication in the at least one second mobile terminal; a second sending unit for sending the communication data to the server of the multi-party interactive communication in the first mobile terminal directly when the communication data is sent to the server of the multi-party interactive communication in the first mobile terminal; a third sending unit for sending the communication data to the client of the multi-party interactive communication in the at least one second mobile terminal by Bluetooth when the communication data is sent to the client of the multi-party interactive communication in the at least one second mobile terminal.

In a preferred embodiment, the third determination unit is configured for determining whether the communication data comes from the client of the multi-party interactive communication in the first mobile terminal according to a second mark carried by the communication data, if the communication data comes from the client of the multi-party interactive communication in the first mobile terminal, the communication data is considered to be sent to the server of the multi-party interactive communication in the first mobile terminal, else the communication data is considered to be sent to the client of the multi-party interactive communication in the at least one second mobile terminal.

In a preferred embodiment, wherein the third sending unit is configured for sending the communication data using Bluetooth to the client of the multi-party interactive communication in the at least one second mobile terminal when the communication data is sent to the client of the multi-party interactive communication in the at least one second mobile terminal, wherein a third mark corresponding to the client of the multi-party interactive communication in the at least one second mobile terminal is carried by the communication data and the communication data is sent according to the third mark.

In a preferred embodiment, the second establishing module includes: a fourth receiving unit for determining whether there is a server of the multi-party interactive communication, if the first mobile terminal is the server of the multi-party interactive communication, taking the wireless direct connection as the underlying link, the first mobile terminal as the server of the multi-party interactive communication, to receive the communication connection request from the at least one second mobile terminal; a first establishing unit for establishing the connection of multi-party interactive communication between the first mobile terminal and the at least one second mobile terminal after the communication connection request is agreed.

In a preferred embodiment, the system further includes: a starting module for taking the first mobile terminal to enable the function of being found of the Bluetooth connection before taking the wireless direct connection as the underlying link; a closing module for taking the first mobile terminal to disable the function of being found of the Bluetooth connection after the first establishing unit establishing the connection of multi-party interactive communication between the first mobile terminal and the at least one second mobile terminal.

In a preferred embodiment, the system further includes: a second sending module for taking the server of the multi-party interactive communication in the first mobile terminal to broadcast the message of establishing the connection of multi-party interactive communication to the client of the multi-party interactive communication in the at least one second mobile terminal by Bluetooth after the first establishing unit establishing the connection of multi-party interactive communication between the first mobile terminal and the at least one second mobile terminal.

In a preferred embodiment, the system further includes: a first determination module for determining whether the number of the participants satisfies the condition of performing multi-party interactive communication after the first establishing unit establishing the connection of multi-party interactive communication between the first mobile terminal and the at least one second mobile terminal; a second communication module for performing multi-party interactive communication when the number of the participants satisfies the condition; an waiting module for waiting until the condition of performing multi-party interactive communication is satisfied when the number of the participants doesn't satisfy the condition.

In a preferred embodiment, the system further includes: a receiving module for taking the server of the multi-party interactive communication in the first mobile terminal to receive a request of quitting from the multi-party interactive communication or a communication error report from the client of the multi-party interactive communication in the at least one second mobile terminal after the first communication module taking the first mobile terminal and the at least one second mobile terminal to perform multi-party interactive communication using the connection of multi-party interactive communication using the connection; a second determination module for determining whether the request of quitting from the multi-party interactive communication should be agreed, and determining whether the connection of multi-party interactive communication should be disconnected; a disconnecting module for disconnecting the connection of multi-party interactive communication between the first mobile terminal and the second mobile terminal corresponding to the request or to the communication error, and clients in other second mobile terminals performing the multi-party interactive communication should be sent an information of disconnecting the connection.

In a preferred embodiment, the multi-party interactive communication in the first mobile terminal and the second mobile terminal is based on iOS.

Furthermore, it is the third object to provide another system of realizing multi-party interactive communication.

A system of realizing multi-party interactive communication, including: a third establishing module for establishing a wireless direct connection between at least one first mobile terminal and a second mobile terminal; a fourth establishing module for establishing a connection of multi-party interactive communication between the at least one first mobile terminal and the second mobile terminal, wherein the wireless direct connection is an underlying link, the at least one first mobile terminal is a server of the multi-party interactive communication, and the second mobile terminal is a client of the multi-party interactive communication; a first communication module for performing multi-party interactive communication between the at least one first mobile terminal and the second mobile terminal via the connection of multi-party interactive communication.

In a preferred embodiment, the fourth establishing module includes: a fourth sending unit for taking the wireless direct connection as the underlying link, the at least one first mobile terminal as a client of the multi-party interactive communication, to send a communication connection request to the server of the multi-party interactive communication in the second mobile terminal; a fifth receiving unit for receiving a message of agreeing communication connection request sent by the server of the multi-party interactive communication in the second mobile terminal; a second establishing unit for establishing the connection of multi-party interactive communication between the at least one first mobile terminal and the second mobile terminal after the fifth receiving unit receiving the message of agreeing the communication connection request.

In a preferred embodiment, the system further includes: an update module for updating a participant display interface of the client of the multi-party interactive communication in the at least one first mobile terminal after the second establishing unit establishing the connection of multi-party interactive communication between the at least one first mobile terminal and the second mobile terminal.

In a preferred embodiment, the fourth sending unit is configured for sending the communication connection request to the server of the multi-party interactive communication in the second mobile terminal by Bluetooth.

Beneficial effects of the present disclosure are: different from traditional technologies, by way of establishing a wireless direct connection between the first mobile terminal and the at least one second mobile terminal, mobile terminals can communicate with each other without the network or the mobile network. The specific operations are: first, making a wireless direct connection as an underlying link, taking the first mobile terminal as a server of the multi-party interactive communication, the at least one second mobile terminal as a client of the multi-party interactive communication, to establish a connection of multi-party interactive communication, in which the participants are the first mobile terminal and the at least one second mobile terminal; then let the first mobile terminal and the at least one second mobile terminal perform multi-party interactive communication via the connection of multi-party interactive communication. By the method mentioned above, the present disclosure can use wireless communication to realize the multi-party interactive communication among mobile terminals even the network is in a poor situation.

DETAILED DESCRIPTION OF THE EMBODIMENTS

The present disclosure will be described in detail with the following embodiments and drawings.

Figure 1:
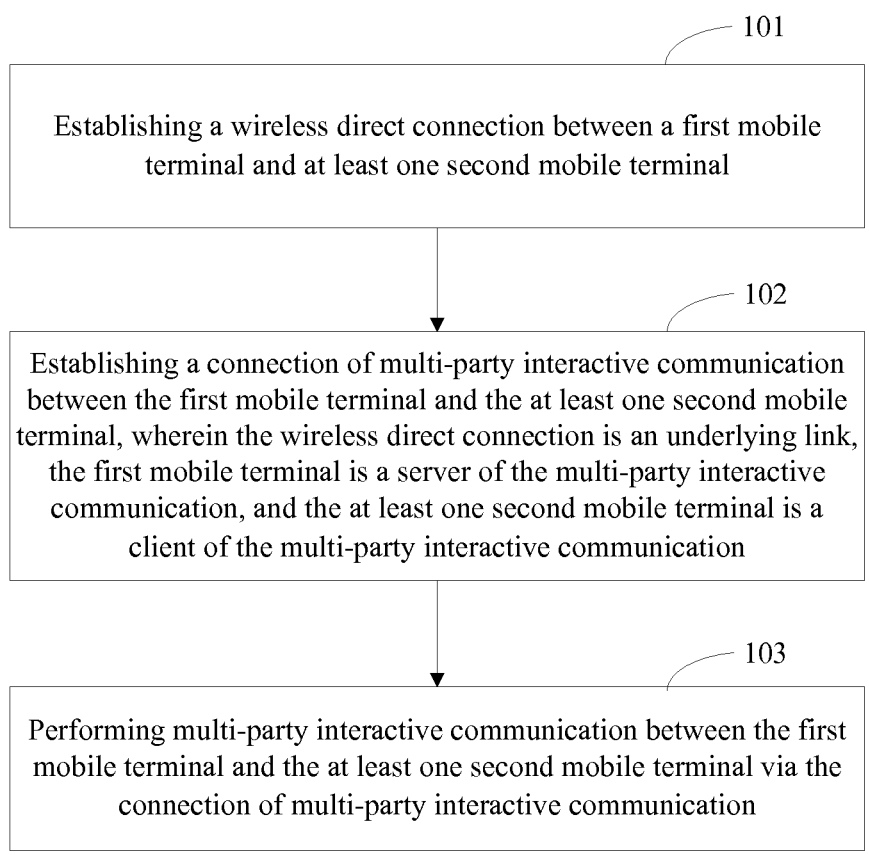
FIG. 1 is a flowchart of a method for realizing multi-party interactive communication in accordance with an embodiment of the present disclosure.

Referring to FIG. 1, FIG. 1 is a flowchart of a method for realizing multi-party interactive communication in accordance with an embodiment of the present disclosure, the method includes steps of:

Step 101, establishing a wireless direct connection between the first mobile terminal and at least one second mobile terminal.

The wireless direct connection between the first mobile terminal and the at least one second mobile terminal are established by Bluetooth, WiFi, etc. The specific method is:

Before connecting, the function of being found of the wireless devices (such as Bluetooth) in the first mobile terminal and the at least one second mobile terminal is enabled, the wireless devices match each other automatically and establish the connection. In an embodiment, the first mobile terminal and the at least one second mobile terminal distinguish each other on the premise of that they own the same pairing key.

Wherein the first mobile terminal and the at least one second mobile terminal are mobile terminals basing on iOS, such as iPhone, iPod, iPad and so on, or mobile terminals basing on other operation system such as Android. When the first mobile terminal and the at least one second mobile terminal are mobile terminals basing on iOS, the multi-party interactive communication is based on iOS.

The wireless direct connection is a direct connection without a network or without a mobile communication network, such as connected by Bluetooth or WiFi mentioned above. It's also called as wireless direct connection that taking one of the mobile terminals as a transit device of Bluetooth connection or WiFi connection for others.

Step 102, establishing a connection of multi-party interactive communication between the first mobile terminal and the at least one second mobile terminal, wherein the wireless direct connection is an underlying link, the first mobile terminal is a server of the multi-party interactive communication, and the at least one second mobile terminal is a client of the multi-party interactive communication.

The method for establishing the connection of multi-party interactive communication is: taking the wireless direct connection as an underlying link, the first mobile terminal as a server of the multi-party interactive communication, the at least one second mobile terminal as a client of the multi-party interactive communication, the server receives communication connection requests from each client, after the communication connection requests are agreed, a connection of multi-party interactive communication is established, in which the participants are the first mobile terminal and the at least one second mobile terminal.

Wherein the first mobile terminal can not only be a server of the multi-party interactive communication, but also be a client as the participant.

Step 103, performing multi-party interactive communication between the first mobile terminal and the at least one second mobile terminal via the connection of multi-party interactive communication.

After the connection of multi-party interactive communication between the first mobile terminal and the at least one second mobile terminal is established, determining whether the number of the participants satisfies the condition of performing multi-party interactive communication, if the number satisfies the condition, performing the multi-party interactive communication, else waiting until the condition is satisfied.

While performing multi-party interactive communication, the function of being found of the wireless device (such as Bluetooth) in the first mobile terminal is disabled.

After the connection of multi-party interactive communication between the first mobile terminal and the at least one second mobile terminal is established, the server of the multi-party interactive communication in the first mobile terminal broadcasts a message of establishing connection of multi-party interactive communication to the client of the multi-party interactive communication in the at least one second mobile terminal by the Bluetooth device.

In the process of performing multi-party interactive communication, if the server of the multi-party interactive communication in the first mobile terminal receives a request of quitting from the multi-party interactive communication or a communication error report from the client of the multi-party interactive communication in the at least one second mobile terminal, determining whether the request of quitting from the multi-party interactive communication should be agreed, and determining whether the connection of multi-party interactive communication should be disconnected. If the request should be agreed or the connection of multi-party interactive communication should be disconnected, the connection of multi-party interactive communication between the first mobile terminal and the second mobile terminal corresponding to the request or to the communication error should be disconnected, and clients in other second mobile terminals performing the multi-party interactive communication should be notified.

Figure 2:
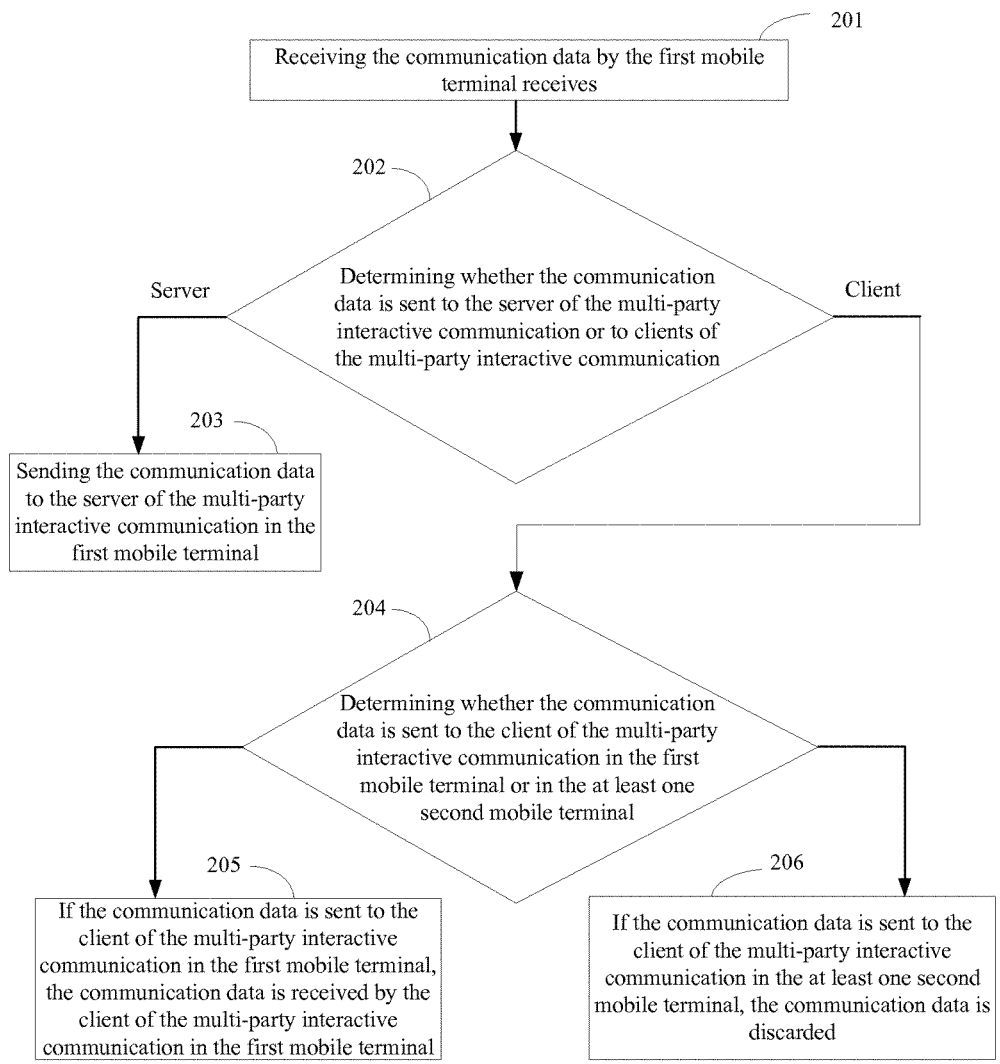
FIG. 2 is a flowchart of the first mobile terminal in the embodiment shown in FIG. 1 receiving and processing game data.

The specific method to realize the multi-party interactive communication is shown in FIG. 2, FIG. 2 is a flowchart of the first mobile terminal in the embodiment shown in FIG. 1 receiving and processing game data, referring to FIG. 2, it includes the following steps:

Step 201, receiving the communication data by the first mobile terminal receives.

The first mobile terminal will establish a special institution for receiving the communication data. The institution analyzes the communication data at first, then sends it to the client or the server in the first mobile terminal to process. Because each mobile terminal has to own the capability of establishing the server and interacting, both the source code of client and server exist in the mobile terminal. The server and the client will only process the data belongs itself. For example, as a client, the local server of the second mobile terminal will not be activated, so the receiving communication data will only be sent to the client and being processed.

The communication data receiving by the first mobile terminal includes: data from the server or the client, belonging mark of data, information of participants, request and control instruction, etc.

Step 202, determining whether the communication data is sent to the server of the multi-party interactive communication or to clients of the multi-party interactive communication.

The determination is based on the first mark carried by the communication data.

Wherein the effect of the first mark is distinguishing whether the communication data is processed by the server or the client.

Step 203, if the communication data is sent to the server of the multi-party interactive communication, the communication data is sent to the server of the multi-party interactive communication in the first mobile terminal.

The server of the multi-party interactive communication processes the communication data after receiving it, and sends the processing result to the client of the multi-party interactive communication in the first mobile terminal and in the at least one second mobile terminal to update their own display interfaces of the multi-party interactive communication.

The processing result is broadcasted to the client of the multi-party interactive communication in the at least one second mobile terminal by the wireless device (such as Bluetooth).

Step 204, else if the communication data is sent to the client of the multi-party interactive communication, determining whether the communication data is sent to the client of the multi-party interactive communication in the first mobile terminal or in the at least one second mobile terminal.

Step 205, if the communication data is sent to the client of the multi-party interactive communication in the first mobile terminal, the communication data is received by the client of the multi-party interactive communication in the first mobile terminal.

Step 206, if the communication data is sent to the client of the multi-party interactive communication in the at least one second mobile terminal, the communication data is discarded.

When the first mobile terminal receives the communication data waiting for sending by the first mobile terminal, determining whether the communication data is sent to the server of the multi-party interactive communication in the first mobile terminal or to the client of the multi-party interactive communication in the at least one second mobile terminal, if the communication data is sent to the server of the multi-party interactive communication in the first mobile terminal, the communication data is sent to the server of the multi-party interactive communication in the first mobile terminal directly, else if the communication data is sent to the client of the multi-party interactive communication in the at least one second mobile terminal, the communication data is sent to the client of the multi-party interactive communication in the at least one second mobile terminal using Bluetooth. The determination is based on the second mark taken by the communication data, if the communication data comes from the client of the multi-party interactive communication in the first mobile terminal, the communication data is considered to be sent to the server of the multi-party interactive communication in the first mobile terminal, else the communication data is considered to be sent to the client of the multi-party interactive communication in the at least one second mobile terminal.

When the communication data is sent to the client of the multi-party interactive communication in the at least one second mobile terminal, according to the third mark corresponding to a destination taken by the determination result, the communication data is sent to the client of the multi-party interactive communication in the at least one second mobile terminal corresponding to the third mark using Bluetooth.

The second mark and the third mark are code corresponding to a client, in other words, different client has different code.

Figure 3:
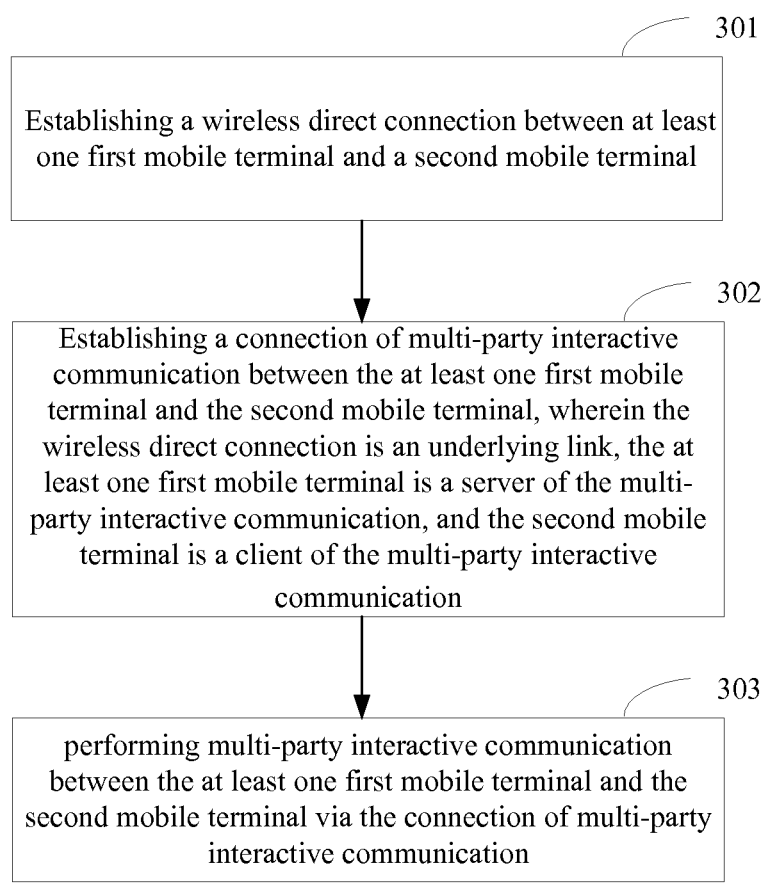
FIG. 3 is a flowchart of the method for realizing multi-party interactive communication in accordance with another embodiment of the present disclosure.

Referring to FIG. 3, FIG. 3 is a flowchart of the method for realizing multi-party interactive communication in accordance with another embodiment of the present disclosure, as shown in FIG. 3, the method includes:

Step 301, establishing a wireless direct connection between at least one first mobile terminal and a second mobile terminal.

Step 302, establishing a connection of multi-party interactive communication between the at least one first mobile terminal and the second mobile terminal, wherein the wireless direct connection is an underlying link, the at least one first mobile terminal is a server of the multi-party interactive communication, and the second mobile terminal is a client of the multi-party interactive communication.

Step 303, performing multi-party interactive communication between the at least one first mobile terminal and the second mobile terminal via the connection of multi-party interactive communication.

The method for establishing the connection of multi-party interactive communication is: taking the wireless direct connection as an underlying link, the at least one first mobile terminal as a client of the multi-party interactive communication, to send a communication connection request to the server of the multi-party interactive communication in the second mobile terminal. After the at least one first mobile terminal receiving a message of agreeing communication connection request sent by the second mobile terminal as a server of the multi-party interactive communication, a connection of multi-party interactive communication is established, in which the participants are the first mobile terminal and the at least one second mobile terminal. At the same time, a participant display interface of the client of the multi-party interactive communication in the at least one first mobile terminal is updated according to the message of agreeing communication connection request sent by the second mobile terminal as the server of the multi-party interactive communication.

The communication connection request is sent to the server of the multi-party interactive communication in the second mobile terminal using Bluetooth.

The basic idea of embodiment shown in FIG. 3 is similar to the embodiment shown in FIG. 1. The embodiment shown in FIG. 3 is enumerated to explain that anyone in the participants of multi-party interactive communication can be the only one server of multi-party interactive communication.

Multi-party interactive communication is widely used in network application, such as online games and group chat, taking online games as an example to explain the present disclosure.

It is well known that the network condition is important to play an online game, and the network condition of a player is different from others, efficiency of data transmission of the player is also different from others while playing, so experience effect is influenced. The present disclosure can realize game battle in a small-scale using mobile terminal when the network condition is poor or disconnecting, so the technical problems of the conventional technologies are solved. The detailed description of embodiment is:

The embodiment transports a game data by a wireless device in a mobile terminal to perform a battle game, the first mobile terminal enables its wireless device and automatically matches with the enabled wireless device in at least one second mobile terminal, so a wireless direct connection is established. The first mobile terminal and the at least one second mobile terminal distinguish each other on the premise of that they own the same pairing key.

The game battle in a small-scale needs a server to process data and a client, wherein any mobile terminal taking part in the game battle can act as the only one server, other mobile terminals will act as a client. So in this embodiment, the wireless device in the first mobile terminal is set as a game server, and the first mobile terminal also includes the first client to play the game. According to the description mentioned above, the wireless device in the at least one second mobile terminal is set as the second client.

In this embodiment, the first mobile terminal and the at least one second mobile terminal can be iPhone, iPod or iPad. If the first mobile terminal and the at least one second mobile terminal are mobile terminals basing on iOS, the method for establishing the server is: any player clicks a table on the game interface of his client, if the table is an empty table, a server would be established after the table is clicked. Establishing the server by clicking the table on the game interface is only an embodiment, method for establishing the server in the present disclosure is not limited in this one.

After the wireless direct connection between the first mobile terminal and the at least one second mobile terminal is established, and the server and the client are set, clients have to join in the server to play the game. First, every second mobile terminal sends a server connection request to the first mobile terminal by Bluetooth connection, the first mobile terminal agree to connect after receiving the server connection request, and establishes a connection to the at least one second mobile terminal. After the connection is established successfully, the game can be start. To prevent other player joining in the game after the members of game battle are determined, the first mobile terminal disabled the function of being found of the wireless device so the server will not be recognized repeatedly.

The process of joining in the multi-party battle game is: after a Bluetooth connection between the first mobile terminal and the at least one second mobile terminal is established, any player can click the table on the game interface corresponding to his mobile terminal, for example, when one player clicks the table on the game interface before the game is started, determining whether there is a server on the table waiting for joining in; if the first mobile terminal has established the server, the player's second mobile terminal sends a server connection request by Bluetooth connection to the first mobile terminal, as the server, the first mobile terminal will send a message to the player about whether the connection is success, if the connection is success, the player's second mobile terminal will send a login data to the server in the first mobile terminal, after receiving the login data, the first mobile terminal will return the login data to the player's second mobile terminal, and broadcasts the login data to clients in other second mobile terminal to notify all players that a new player is joining in the game, at the same time, the first mobile terminal will broadcast a data of the other players to the client in the player's second mobile terminal.

The situation mentioned above is that there is a server on the table, if there is no server on the table when a player clicks the table on the game surface, the player's first mobile terminal will establish a server proactively, the type of the server is battle mode. The first mobile terminal also owns a client called local client. After a connection between the server and the local client is established, the server returns a message of connecting successfully, and broadcasts the message to all the second mobile terminals. The data type is marked by type=userid, userid is a player code, which is changed from the ID corresponding to the wireless device, the server distinguishes players according to userid. The clients can determine whether a data sent from the server is needed according to userid, if it is, the data will be received, else the data will be discarded.

In the two situations mentioned above, if the number of players is not enough, all players will wait for other players or virtual players joining in the game until the number of players is enough, then the game is started. The required number of players can be set by a user.

When the game starts, every player need send and receive data constantly, the first mobile terminal will establish a special institution for receiving the communication data. The institution analyzes the communication data at first, then sends the communication data to the client or the server in the first mobile terminal in order to process. Because each mobile terminal has to own the capability of establishing the server and playing game, both the source code and the client code exist in the mobile terminal. The server and the client will only process the data belongs itself. For example, as a client, the local server of the at least one second mobile terminal will not be activated, so the receiving communication data will only be sent to the client and being processed.

The receiving game data includes: data from the server or the client, belonging mark of data, player information, battle information, etc. The belonging mark of data is: data that need be processed by the server has a mark of 1, data broadcasted to the client by the server has a mark of 3, data that need to be processed by the client has a mark of 0. Of course, other symbol can be used instead of the numeral mark.

There is an embodiment that taking the first mobile terminal as an example to explain the process of the game data after the game data is received. After the first mobile terminal receives the game data, determining whether the data type of the receiving game data should be processed in the server or in the client according to the mark of data.

Because the first mobile terminal includes a server and a local client, when the receiving game data should be processed in the server, the server would receive and process the data; when the receiving game data should be processed in the local client, the local client would receive the game data, and the game data includes a data has a mark of 0 which means should be processed in the local client and a data has a mark of 3 which means the game data is broadcasted to the client by the server. Because the data is various and numerous, it needs to be determined whether the game data is a data belongs to the local client according to the player code "userid", if the receiving game data is a data belongs to the local client, the local client responds and processes the game data, else the game data is discarded.

The data of client in at least one second mobile terminal and local client of the first mobile terminal needs to be processed by the server in the first mobile terminal. When a client sends a data, if the data is sent by the local client (determining by the player code), the data is sent to the server in the first mobile terminal directly; if the data is sent by the client in the at least one second mobile terminal, the wireless device in the at least one second mobile terminal sends the data to the server in the first mobile terminal.

When the game is over or in progress, a player can click the quit button to quit from the game, then the game interface will appears a pop-up dialog box includes two buttons (YES and NO) to ask the player does he really want to quit from the game, if the player clicks the button of YES, the system will sent a game quitting request to the server in the first mobile terminal, then the server verify the request, if the quitting should be allowed, the server returns a game quitting data to the player's client and broadcasts to other players that the player quits from the game; if the player clicks the button of NO, the pop-up dialog box will disappear and the player will returns to the game.

If a player disconnects in an abnormal condition, such as the wireless communication is disconnected, the method for quitting from the game is: If the wireless communication of the first mobile terminal acting as a server is disconnected unexpectedly, all players in battle disconnect the wireless connection, the game is over automatically. If the wireless communication of the at least one second mobile terminal acting as a client is disconnected unexpectedly, the at least one second mobile terminal disconnect the wireless connection to the server in the first mobile terminal, the game is over automatically, and the other players will receive a message of the player quitting from the game.

If the client in the first mobile terminal quits from the game, the server in the first mobile terminal sends a quitting command to all the other players, all the players disconnects the connection and quits from the game after receiving the command.

In summary, the present disclosure establishes a wireless direct connection between the first mobile terminal and the at least one second mobile terminal, so mobile terminals can communicate with each other. The specific operations are: first, establishing a connection of multi-party interactive communication between the first mobile terminal and the at least one second mobile terminal, wherein the wireless direct connection is an underlying link, the first mobile terminal is a server of the multi-party interactive communication, the at least one second mobile terminal is a client of the multi-party interactive communication, and the participants are the first mobile terminal and the at least one second mobile terminal; then performing multi-party interactive communication between the first mobile terminal and the at least one second mobile terminal via the connection of multi-party interactive communication. By the method mentioned above, the present disclosure can use wireless communication to realize the multi-party interactive communication among mobile terminals even the network is in a poor situation.

Figure 4:
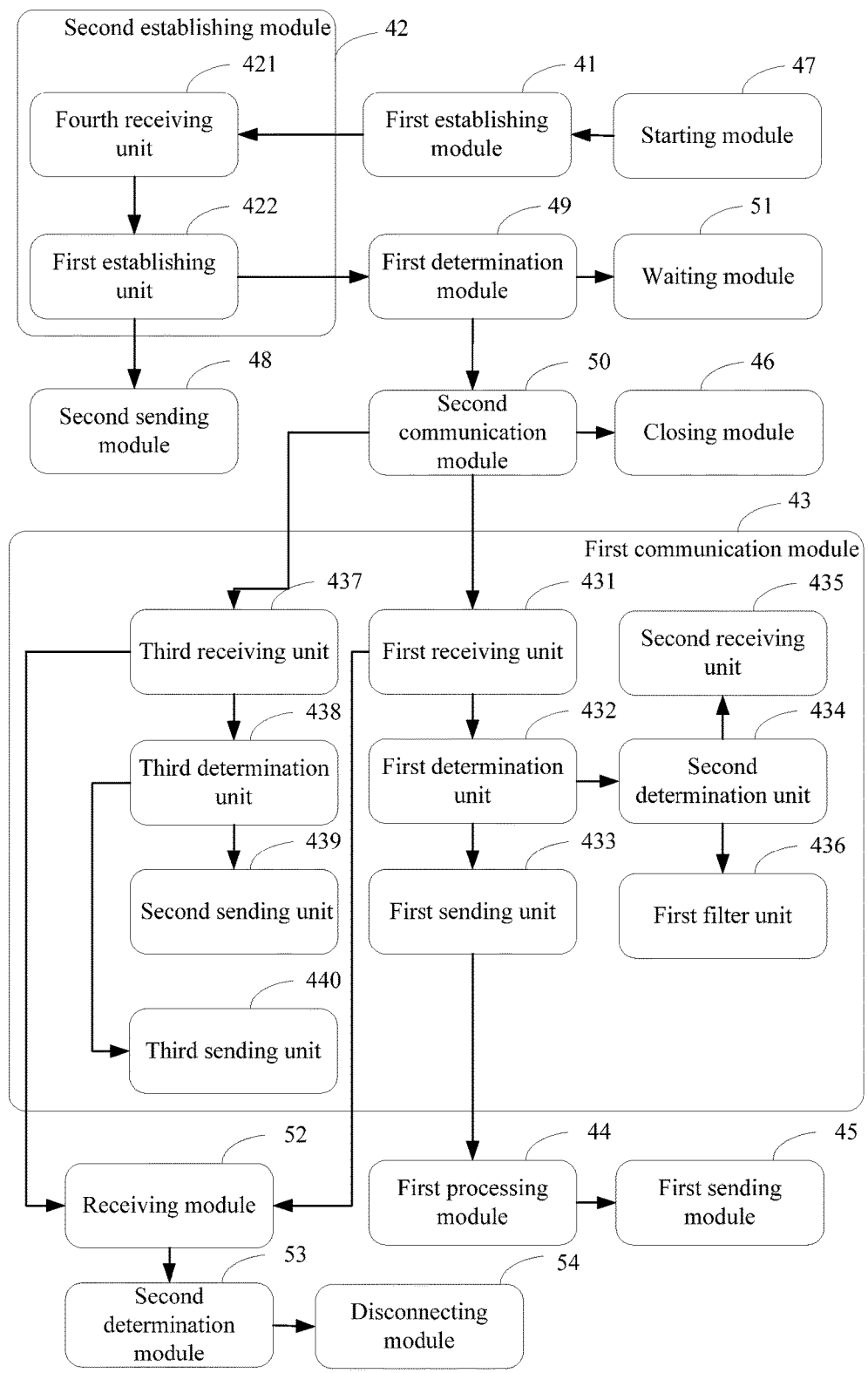
FIG. 4 is a schematic diagram of a system for realizing multi-party interactive communication in accordance with an embodiment of the present disclosure.

Referring to FIG. 4, FIG. 4 is a schematic diagram of a system for realizing multi-party interactive communication in accordance with an embodiment of the present disclosure, as shown in FIG. 4, the system includes: a first establishing module 41, a second establishing module 42, a first communication module 43, a first processing module 44, a first sending module 45, a closing module 46, a starting module 47, a second sending module 48, a first determination module 49, a second communication module 50, a waiting module 51, a receiving module 52, a second determination module 53 and a disconnecting module 54.

The second establishing module 42 includes a fourth receiving unit 421 and a first establishing unit 422. The first communication module 43 includes a first receiving unit 431, a first determination unit 432, a first sending unit 433, a second determination unit 434, a second receiving unit 435, a first filter unit 436, a third receiving unit 437, a third determination unit 438, a second sending unit 439 and a third sending unit 440.

The first establishing module 41 is configured for establishing a wireless direct connection between the first mobile terminal and at least one second mobile terminal; the second establishing module 42 is configured for establishing a connection of multi-party interactive communication between the first mobile terminal and the at least one second mobile terminal, wherein the wireless direct connection is an underlying link, the first mobile terminal is a server of the multi-party interactive communication, the at least one second mobile terminal is a client of the multi-party interactive communication, and the participants are the first mobile terminal and the at least one second mobile terminal. The first communication module 43 is configured for performing multi-party interactive communication between the first mobile terminal and the at least one second mobile terminal via the connection of multi-party interactive communication.

The fourth receiving unit 421 is configured for determining whether there is a server of the multi-party interactive communication, if the determination is that the first mobile terminal is the server of the multi-party interactive communication, taking the wireless direct connection as the underlying link, the first mobile terminal as the server of the multi-party interactive communication, to receive a communication connection request from the at least one second mobile terminal.

The first establishing unit 422 is configured for establishing the connection of multi-party interactive communication after the communication connection request is agreed, in which the participants are the first mobile terminal and the at least one second mobile terminal.

The first receiving unit 431 is configured for taking the first mobile terminal to receive a communication data after the connection of multi-party interactive communication is established. The first determination unit 432 is configured for determining whether the communication data is sent to the server of the multi-party interactive communication or to the client of the multi-party interactive communication, wherein the first determination unit 432 determines whether the communication data is sent to the server of the multi-party interactive communication or to the client of the multi-party interactive communication according to the first mark carried by the communication data. The first sending unit 433 is configured for sending the receiving communication data to the server of the multi-party interactive communication in the first mobile terminal when the communication data is sent to the server. The second determination unit 434 is configured for determining whether the communication data is sent to the client of the multi-party interactive communication in the first mobile terminal or in the at least one second mobile terminal when the communication data is sent to the client. The second receiving unit 435 is configured for taking the client of the multi-party interactive communication in the first mobile terminal to receive the communication data when the communication data is sent to the client of the multi-party interactive communication in the first mobile terminal. The first filter unit 436 is configured for discarding the communication data when the communication data is sent to the client of the multi-party interactive communication in the at least one second mobile terminal.

The first processing module 44 is configured for taking the server of the multi-party interactive communication in the first mobile terminal to process the communication data and obtain the processing result after the first sending unit 433 sending the receiving communication data to the first mobile terminal. The first sending module 45 is configured for sending the processing result to the client of the multi-party interactive communication in the first mobile terminal and to the client of the multi-party interactive communication in the at least one second mobile terminal to update their display interfaces of the multi-party interactive communication, and broadcasting the processing result to the client of the multi-party interactive communication in the at least one second mobile terminal using Bluetooth.

The third receiving unit 437 is configured for taking the first mobile terminal to receive the communication data from itself. The third determination unit 438 is configured for determining whether the communication data is sent to the server of the multi-party interactive communication in the first mobile terminal or to the client of the multi-party interactive communication in the at least one second mobile terminal, specifically, the determination is based on the second mark taken by the communication data, if the communication data comes from the client of the multi-party interactive communication in the first mobile terminal, the communication data is considered to be sent to the server of the multi-party interactive communication in the first mobile terminal, else the communication data is considered to be sent to the client of the multi-party interactive communication in the at least one second mobile terminal. The second sending unit 439 is configured for sending the communication data to the server of the multi-party interactive communication in the first mobile terminal directly when the communication data is sent to the server of the multi-party interactive communication in the first mobile terminal. The third sending unit 440 is configured for sending the communication data to the client of the multi-party interactive communication in the at least one second mobile terminal by Bluetooth when the communication data is sent to the client of the multi-party interactive communication in the at least one second mobile terminal, specifically, when the communication data is sent to the client of the multi-party interactive communication in the at least one second mobile terminal, according to the third mark corresponding to a destination taken by the determination result, the third sending unit 440 sends the communication data using Bluetooth to the client of the multi-party interactive communication in the at least one second mobile terminal corresponding to the third mark.

The starting module 47 is configured for taking the first mobile terminal to enable the function of being found of the Bluetooth connection before taking the wireless direct connection as the underlying link.

The closing module 46 is configured for taking the first mobile terminal to disable the function of being found of the Bluetooth connection after the first establishing unit 422 establishing the connection of multi-party interactive communication between the first mobile terminal and the at least one second mobile terminal.

After the first establishing unit 422 establishing the connection of multi-party interactive communication between the first mobile terminal and the at least one second mobile terminal, the second sending module 48 is configured for taking the server of the multi-party interactive communication in the first mobile terminal to broadcast the message of establishing the connection of multi-party interactive communication to the client of the multi-party interactive communication in the at least one second mobile terminal by Bluetooth.

The first determination module 49 is configured for determining whether the number of the participants satisfies the condition of performing multi-party interactive communication after the first establishing unit 422 establishing the connection of multi-party interactive communication between the first mobile terminal and the at least one second mobile terminal.

If the first determination module 49 determines that the number of the participants satisfies the condition, the second communication module 50 performs multi-party interactive communication, the first receiving unit 431 takes the first mobile terminal to receive the communication data or the third receiving unit 437 takes the first mobile terminal to receive the communication data from the first mobile terminal waiting to be sent; else if the first determination module 49 determines that the number of the participants doesn't satisfy the condition, the waiting module 51 waits until the condition of performing multi-party interactive communication is satisfied.

After the first communication module 43 performing multi-party interactive communication between the first mobile terminal and the at least one second mobile terminal via the connection of multi-party interactive communication, in other words, after the first receiving unit taking the first mobile terminal to receive the communication data or the third receiving unit 437 taking the first mobile terminal to receive the communication data from the first mobile terminal waiting to be sent, the receiving module 52 takes the server of the multi-party interactive communication in the first mobile terminal to receive the request of quitting from the multi-party interactive communication or a communication error report from the client of the multi-party interactive communication in the at least one second mobile terminal. The second determination module 53 is configured for determining whether the request of quitting from the multi-party interactive communication should be agreed, and determining whether the connection of multi-party interactive communication should be disconnected. When the second determination module 53 determines that the request should be agreed or the connection of multi-party interactive communication should be disconnected, the disconnecting module 54 is configured for disconnecting the connection of multi-party interactive communication between the first mobile terminal and the second mobile terminal corresponding to the request or to the communication error, and clients in other second mobile terminals performing the multi-party interactive communication should be sent an information of disconnecting the connection.

Specific working method of devices mentioned above is: First, the starting module 47 enables the function of being found of the wireless device (such as Bluetooth) in the first mobile terminal; after the first establishing module 41 establishing a wireless direct connection between the first mobile terminal and at least one second mobile terminal, the second establishing module 42 establishing a connection of multi-party interactive communication between the first mobile terminal and the at least one second mobile terminal, wherein the wireless direct connection is an underlying link, the first mobile terminal is a server of the multi-party interactive communication, the at least one second mobile terminal is a client of the multi-party interactive communication, and the participants are the first mobile terminal and the at least one second mobile terminal. The specific connection method is: First, the fourth receiving unit 421 determines whether there is a server of the multi-party interactive communication, if the first mobile terminal is the server of the multi-party interactive communication, taking the wireless direct connection as the underlying link, the first mobile terminal as the server of the multi-party interactive communication, to receive communication connection request from the at least one second mobile terminal. After the communication connection request is agreed, the first establishing unit 422 establishes the connection of multi-party interactive communication, in which the participants are the first mobile terminal and the at least one second mobile terminal. At last, the first communication module 43 takes the first mobile terminal and the at least one second mobile terminal to perform the multi-party interactive communication via the connection of multi-party interactive communication.

The method of the first communication module 43 performing the multi-party interactive communication is: the first receiving unit 431 takes the first mobile terminal to receive the communication data at first, then the first determination unit 432 determines whether the communication data is sent to the server of the multi-party interactive communication or to the client of the multi-party interactive communication, wherein the determination is based on the first mark carried by the communication data. If the communication data is sent to the server of the multi-party interactive communication, the first sending unit 433 sends the communication data to the server of the multi-party interactive communication in the first mobile terminal; else if the communication data is sent to the client of the multi-party interactive communication, the second determination unit 434 determines the communication data is sent to the client of the multi-party interactive communication in the first mobile terminal or in the at least one second mobile terminal, if the communication data is sent to the client of the multi-party interactive communication in the first mobile terminal, the second receiving unit 435 takes the client of the multi-party interactive communication in the first mobile terminal to receive the communication data, if the communication data is sent to the client of the multi-party interactive communication in the at least one second mobile terminal, the communication data is discarded by the first filter unit 436.

After the first sending unit 433 sending the receiving communication data to the first mobile terminal, the first processing module 44 takes the server of the multi-party interactive communication in the first mobile terminal to process the communication data and obtain the processing result, the first sending module 45 sends the processing result to the client of the multi-party interactive communication in the first mobile terminal and the client of the multi-party interactive communication in the at least one second mobile terminal to update their display interfaces of the multi-party interactive communication. The first sending module 45 broadcasts the processing result to the client of the multi-party interactive communication in the at least one second mobile terminal by Bluetooth.

Another method of the first communication module 43 performing the multi-party interactive communication is: First, takes the first mobile terminal to receive the communication data waiting for sending by first mobile terminal, then the third determination unit 438 determines whether the communication data is sent to the server of the multi-party interactive communication in the first mobile terminal or to the client of the multi-party interactive communication in the at least one second mobile terminal, wherein the third determination unit 438 determines whether the communication data comes from the client of the multi-party interactive communication in the at least one second mobile terminal according to the second mark taken by the communication data, if the communication data comes from the client of the multi-party interactive communication in the first mobile terminal, the communication data is considered to be sent to the server of the multi-party interactive communication in the first mobile terminal, else the communication data is considered to be sent to the client of the multi-party interactive communication in the at least one second mobile terminal. If the communication data is sent to the server of the multi-party interactive communication in the first mobile terminal, the communication data is sent to the server of the multi-party interactive communication in the first mobile terminal by the second sending unit 439 directly; else if the communication data is sent to the client of the multi-party interactive communication in the at least one second mobile terminal, the third sending unit 440 sends the communication data to the client of the multi-party interactive communication in the at least one second mobile terminal using Bluetooth, when the communication data is sent to the client of the multi-party interactive communication in the at least one second mobile terminal, according to the third mark corresponding to a destination taken by the determination result, the third sending unit 440 sends the communication data to the client of the multi-party interactive communication in the at least one second mobile terminal corresponding to the third mark using Bluetooth.

After the connection of multi-party interactive communication between the first mobile terminal and the at least one second mobile terminal is established by the first establishing unit 422, the second sending module 48 takes the server of the multi-party interactive communication in the first mobile terminal to broadcast a message of establishing connection of multi-party interactive communication to the client of the multi-party interactive communication in the at least one second mobile terminal by the Bluetooth device.

After the connection of multi-party interactive communication between the first mobile terminal and the at least one second mobile terminal is established by the first establishing unit 422, the first determination module 49 determines whether the number of the participants satisfies the condition of performing multi-party interactive communication, if the number satisfies the condition, the second communication module 50 performs the multi-party interactive communication, in other words, to receives and process the communication data, and the closing module 46 takes the first mobile terminal to disable the function of being found of the Bluetooth connection; else if the number doesn't satisfy the condition, the waiting module 51 waits until the condition is satisfied.

After the first communication module 43 taking the first mobile terminal and at least one second mobile terminal to perform the multi-party interactive communication via the connection of multi-party interactive communication, the receiving module 52 takes the server of the multi-party interactive communication in the multi-party interactive communication to receive the request of quitting from the multi-party interactive communication or a communication error report from the client of the multi-party interactive communication in the at least one second mobile terminal, the second determination module 53 determines whether the request of quitting from the multi-party interactive communication should be agreed, and determines whether the connection of multi-party interactive communication should be disconnected. If the second determination module 53 determines the request should be agreed or the connection of multi-party interactive communication should be disconnected, the disconnecting module 54 disconnects the connection of multi-party interactive communication between the first mobile terminal and the second mobile terminal corresponding to the request or to the communication error, and sends the information of disconnecting the connection to clients in other second mobile terminals performing the multi-party interactive communication.

Figure 5:
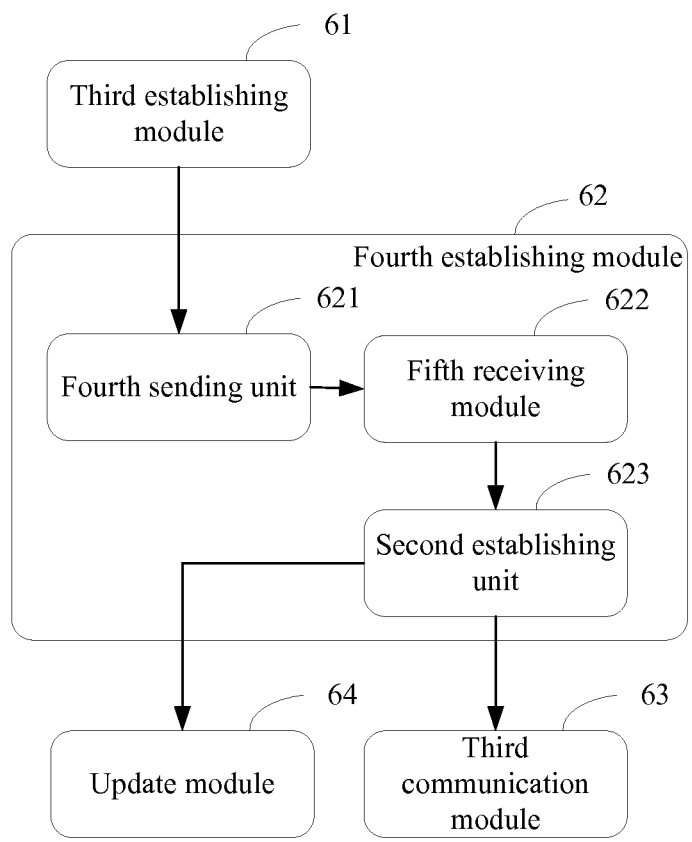
FIG. 5 is a schematic diagram of a system for realizing multi-party interactive communication in accordance with another embodiment of the present disclosure.

Referring to FIG. 5, FIG. 5 is a schematic diagram of a system for realizing multi-party interactive communication in accordance with another embodiment of the present disclosure, as shown in FIG. 5, the system includes a third establishing module 61, a fourth establishing module 62, a third communication module 63 and an update module 64, wherein the fourth establishing module 62 includes a fourth sending unit 621, a fifth receiving module 622 and a second establishing unit 623.

The third establishing module 61 is configured for establishing a wireless direct connection between at least one first mobile terminal and a second mobile terminal. The fourth establishing module 62 is configured for establishing a connection of multi-party interactive communication between the first mobile terminal and the at least one second mobile terminal, wherein the wireless direct connection is an underlying link, the first mobile terminal is a server of the multi-party interactive communication, the at least one second mobile terminal is a client of the multi-party interactive communication, and the participants are the at least one first mobile terminal and the second mobile terminal. The third communication module 63 is configured for performing multi-party interactive communication between the first mobile terminal and the at least one second mobile terminal via the connection of multi-party interactive communication.

The method of the fourth establishing module 62 to establish the connection of multi-party interactive communication is: The fourth sending unit 621 takes the wireless direct connection as an underlying link, the at least one first mobile terminal as a client of the multi-party interactive communication, to send a communication connection request to the server of the multi-party interactive communication in the second mobile terminal, wherein the fourth sending unit 621 is specifically configured for sending the communication connection request to the server of the multi-party interactive communication in the second mobile terminal by Bluetooth. The fifth receiving unit 622 is configured for receiving a message of agreeing communication connection request sent by the server of the multi-party interactive communication in the second mobile terminal. After the fifth receiving unit 622 receiving the message of agreeing communication connection request, the second establishing unit 623 establishes the connection of multi-party interactive communication between the at least one first mobile terminal and the second mobile terminal. After the second establishing unit 623 establishing the connection of multi-party interactive communication between the at least one first mobile terminal and the second mobile terminal, the update module 64 updates a participant display interface of the client of the multi-party interactive communication in the at least one first mobile terminal.

According to the system mentioned above, the present disclosure establishes a wireless direct connection between the first mobile terminal and the at least one second mobile terminal, so mobile terminals can communicate with each other. The specific operations are: first, making a wireless direct connection as an underlying link, taking the first mobile terminal as a server of the multi-party interactive communication, the at least one second mobile terminal as a client of the multi-party interactive communication, to establish a connection of multi-party interactive communication, in which the participants are the first mobile terminal and the at least one second mobile terminal; then let the first mobile terminal and the at least one second mobile terminal perform multi-party interactive communication via the connection of multi-party interactive communication. By the method mentioned above, the present disclosure can use wireless communication to realize the multi-party interactive communication among mobile terminals even the network is in a poor situation.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A method for realizing multi-party interactive communication for a multi-user computer game, comprising:
providing a plurality of mobile terminals, each of the plurality of mobile terminals having both a server module that functions as a game server and a client module that functions as a game client;

wherein one mobile terminal of the plurality of mobile terminals of the multi-party interactive communication functions as a game server;

in response to initiation of a session of the game on a first mobile terminal, the first mobile terminal determining whether a second mobile terminal, accessible to the first mobile terminal via direct wireless communication, has already been designated as the server for the game session;

responsive to determining that the second mobile terminal has already been designated as the server for the game session, the first mobile terminal being registered with the second mobile terminal as a client for the game session;

responsive to determining that no second mobile terminal has already been designated as the server for the game session:

the first mobile terminal being designated as the server for the game session, in response to the first mobile terminal receiving gaming data the first mobile terminal determining that the gaming data is destined for the server for the game session and forwarding the gaming data to the server module of the first mobile terminal, and in response to determining that the gaming data is destined for a client in a third mobile terminal, then the first mobile terminal forwarding the gaming data toward the third mobile terminal via a direct wireless communication link.

2. The method of claim 1, wherein providing a plurality of mobile terminals comprises downloading to each of the mobile terminals in the plurality both the server module for the game and the client module for the game.

3. The method of claim 1, wherein forwarding the gaming data toward the other mobile terminal via a direct wireless communication link comprises transmitting the gaming data to the other mobile terminal via a local area network which is shared among all the mobile terminals in the plurality of mobile terminals.

4. The method of claim 1, wherein forwarding the gaming data toward the other mobile terminal via a direct wireless communication link comprises transmitting the gaming data to the other mobile terminal via Bluetooth.

5. The method of claim 1, wherein the first mobile terminal being registered with the other mobile terminal as a client for the game session comprises the first mobile terminal sending a connection request to the other mobile terminal via a Bluetooth connection with the other mobile terminal.

6. The method of claim 1, further comprising, in response to receipt from a second one of the plurality of mobile terminals of second gaming data responsive to user activity at a second one of the mobile terminals, received while the first mobile terminal is designated as server for the game session, the first mobile terminal:

determining whether the second gaming data is destined for the server for the game session or is destined for a client for the game session;

if it is destined for the server then the first mobile terminal forwarding the gaming data to the server module of the first mobile terminal;

and if it is destined for a client then:

the first mobile terminal determining whether the destination client is at the first mobile terminal or at a further mobile terminal of the plurality of mobile terminals, and forwarding the second gaming data toward the client module of the first mobile terminal only if the destination client is at the first mobile terminal.

7. A system for use by a plurality of mobile terminals to realize multi-party interactive communication for a multi-user computer game, a first one of the mobile terminals comprising:

a processor coupled to a memory;

a server module for the game and a client module for the game, the server module comprising server software code in the memory which when executed by the processor conducts server functions for the game, and the client module comprising client software code in the memory which when executed by the processor conducts client functions for the game;

an establishing module comprising software code portions in the memory which when executed by the processor, determine in response to initiation of a session of the game on the first mobile terminal whether another one of the mobile terminals, accessible to the first mobile terminal via direct wireless communication, has already been designated as server for the game session, and if so then registers the first mobile terminal with the other mobile terminal as a client for the game session, and if not then the first mobile terminal being designated as server for the game session; and a communication module comprising software code portions in the memory which when executed by the processor, determine in response to receipt of gaming data responsive to activity at the client module of the first mobile terminal in the game session, while the first mobile terminal is designated as server for the game session, whether the gaming data is destined for the server for the game session or is destined for another client for the game session, and if it is destined for the server then forwards the gaming data to the server module of the first mobile terminal, and if it is destined for a client then forwards the gaming data toward the other mobile terminal via a direct wireless communication link.

8. The system of claim 7, wherein in forwarding the gaming data toward the other mobile terminal via a direct wireless communication link, the first mobile terminal transmits the gaming data to the other mobile terminal via a local area network which is shared among all the mobile terminals in the plurality of mobile terminals.

9. The system of claim 7, wherein in forwarding the gaming data toward the other mobile terminal via a direct wireless communication link, the first mobile terminal transmits the gaming data to the other mobile terminal via Bluetooth.

10. The system of claim 7, wherein in registering with the other mobile terminal as a client for the game session, the first mobile terminal sends a connection request to the other mobile terminal via a Bluetooth connection with the other mobile terminal.

11. The system of claim 7, wherein the communication module further, in response to receipt from a second one of the mobile terminals of second gaming data responsive to user activity at a second one of the mobile terminals, received while the first mobile terminal is designated as server for the game session:

determines whether the second gaming data is destined for the server for the game session or is destined for a client for the game session;

if it is destined for the server then forwards the gaming data to the server module of the first mobile terminal;

and if it is destined for a client then:
  determines whether the destination client is at the first mobile terminal or at a further mobile terminal of the plurality of mobile terminals, and
  forwards the second gaming data toward the client module of the first mobile terminal only if the destination client is at the first mobile terminal.

12. The system of claim 7, further comprising the other mobile terminal.

13. The system of claim 12, wherein the other mobile terminal comprises a server module for the game and a client module for the game.

14. A method for realizing multi-party interactive communication for a multi-user computer game, comprising:
  providing a plurality of mobile terminals each of the plurality of mobile terminals having both a server module that functions as a game server and a client module that functions as a game client;
  wherein one mobile terminal of the plurality of mobile terminals of the multi-party interactive communication functions as a game server;
  in response to initiation of a session of the game on a first mobile terminal, the first mobile terminal determining whether a second mobile terminal, accessible to the first mobile terminal via direct wireless communication, has already been designated as the server for the game session;
  responsive to determining that the second mobile terminal has already been designated as the server for the game session, the first mobile terminal being registered with the ether second mobile terminal as a client for the game session;
  responsive to determining that no second mobile terminal has already been designated as the server for the game session:
    the first mobile terminal being designated as the server for the game session,
    in response to the first mobile terminal receiving gaming data the first mobile terminal determining that the gaming data is destined for the server module for the game session
    and forwarding the gaming data to the server module of the first mobile terminal,
    and in response to determining that the gaming data is destined for the client module of the first mobile terminal then the first mobile terminal forwarding the gaming data toward the client module of the first mobile terminal.

15. The method of claim 14, wherein providing a plurality of mobile terminals comprises downloading to each of the mobile terminals in the plurality both the server module for the game and the client module for the game.

16. The method of claim 14, wherein forwarding the gaming data toward the other mobile terminal via a direct wireless communication link comprises transmitting the gaming data to the other mobile terminal via a local area network which is shared among all the mobile terminals in the plurality of mobile terminals.

17. The method of claim 14, wherein forwarding the gaming data toward the other mobile terminal via a direct wireless communication link comprises transmitting the gaming data to the other mobile terminal via Bluetooth.

18. The method of claim 14, wherein the first mobile terminal being registered with the other mobile terminal as a client for the game session comprises the first mobile terminal sending a connection request to the other mobile terminal via a Bluetooth connection with the other mobile terminal.

* * * * *